United States Patent [19]
Jannson et al.

[11] Patent Number: 5,083,219
[45] Date of Patent: Jan. 21, 1992

[54] METHOD AND APPARATUS FOR RECORDING LIPPMAN HOLOGRAPHIC MIRRORS

[75] Inventors: Tomasz P. Jannson; Joanna L. Jannson, both of Torrance; Christopher C. Rich, San Pedro, all of Calif.

[73] Assignee: Physical Optics Corporation, Torrance, Calif.

[21] Appl. No.: 456,175

[22] Filed: Dec. 26, 1989

[51] Int. Cl.$^5$ .............................................. G03H 1/04
[52] U.S. Cl. .......................................... 359/1; 359/34; 359/35
[58] Field of Search .................. 350/3.6, 3.66, 3.67, 350/3.69, 3.75, 3.76, 3.78

[56] References Cited

U.S. PATENT DOCUMENTS

| | | | |
|---|---|---|---|
| 3,551,018 | 12/1970 | Stetson | 350/3.67 |
| 3,997,266 | 12/1976 | Hildebrand | 350/3.6 |
| 4,411,489 | 10/1983 | McGrew | 350/3.69 |
| 4,510,575 | 4/1985 | Mueller et al. | 350/3.75 |
| 4,857,425 | 8/1989 | Phillips | 350/3.69 |
| 4,943,126 | 7/1990 | Lang et al. | 350/3.6 |
| 4,966,428 | 10/1990 | Phillips | 350/3.6 |

*Primary Examiner*—Bruce Y. Arnold
*Assistant Examiner*—J. P. Ryan
*Attorney, Agent, or Firm*—Nilles & Nilles

[57] ABSTRACT

An apparatus for recording Lippman holographic mirrors comprises an exposing volume optically coupled on one side with an index-matching fluid to the holographic material to be recorded. The volume is exposed on an adjacent side to a light beam expanded in one direction into a plane of light whose projection on the volume is a line. The line of light and the holographic material are moved relative to each other on an interrupted or a continuous basis to expose the holographic material.

25 Claims, 4 Drawing Sheets

$\Lambda_{//} = \infty$

METHOD AND APPARATUS FOR RECORDING LIPPMAN HOLOGRAPHIC MIRRORS

BACKGROUND OF THE INVENTION

1. Field of Use

This invention relates generally to holographic mirrors and apparatuses and methods for recording such mirrors. More specifically, the present invention relates to high volume production of Lippman holographic mirrors.

2. Description of the Prior Art

Significant progress in high-resolution phase holographic materials such as dichromated gelatin (DCG), PVA-based polymers, PMMA-based polymers and DCG/polymer grafts, has stimulated interest in several attractive applications of high efficiency Bragg holography, including holographic notch filters, Lippman holographic mirrors, holographic optical elements (HOE), display holograms, holographic gradings, and, recently, VLSI holoplanar interconnects TM.

In all of these applications, very intense (>5W) and stable continuous power argon laser sources may be used. Bragg wavelength shift (0.3-3 um), tunability of Bragg bandwidth (5 nm-300 nm), and variable refractive index modulation (0.0001-0.1) are achieved by suitable coating, exposing, and processing. All holograms regardless of their application are coated, exposed, and processed during manufacture.

Advances in each of these manufacturing processes will be important to the further advancement of and mass production of high resolution phase holographic materials in all applications.

Lippman holographic mirrors are just one of the many applications for such high resolution holographic materials but an extremely important and useful application that affords many important advantages over other types of holograms. Lippman holographic mirrors are holograms whose Bragg surfaces are parallel to one or more of the surfaces of the hologram. Referring to FIG. 5(a) a Lippman hologram is shown. The Bragg planes are parallel to the top and bottom surfaces of the holographic volume. Referring to FIG. 5(b), a non-Lippman hologram is depicted It can be seen that the Bragg surfaces are parallel to none of the surfaces of the volume.

Lippman holograms are extremely useful in many applications for several reasons, one primary one being that Lippman holograms do not suffer from chromatic (wavelength) dispersion. Referring to Eq. 1:

$$\text{Sin } \beta - \text{Sin } \alpha = \frac{\lambda}{\Lambda_{//}} \quad \text{(Eq. 1)}$$

which shows the relationship between $\alpha$, the angle of incidence, $\beta$, the angle of diffraction, $\lambda$, the optical wavelength, and $\Lambda_{//}$, the grating constant horizontal component, it is seen that the angles $\beta$ and $\alpha$ are related to the ratio of the optical wavelength to the grating constant Referring now to FIG. 6, the angles $\alpha$ and $\beta$ are shown and the x or horizontal axis schematically represents a hologram. It can be seen that the angle $\alpha$ is the angle of incidence of the light wave upon the hologram and is defined as the angle between the axis perpendicular to the hologram and the incident light wave. Likewise it can be seen that the angle $\beta$ is defined as the angle between the axis perpendicular to the hologram and the exiting angle of the light wave.

Referring back to FIG. 5, the grating constant, $\Lambda$, is the distance between Bragg planes in the holograms. In FIG. 5(a), the grating constant $\Lambda$ is entirely in the vertical direction and is the distance between the horizontally oriented Bragg planes in that figure. Note that the horizontal component of the grating constant, $\Lambda_{//}$, equals infinity. Referring again to FIG. 5(b) the grating constant $\Lambda$ is the distance between the Bragg planes oriented from the lower left to upper right. Also shown in FIG. 5(b) is the grating constant in the horizontal direction, $\Lambda_{//}$. In this case the horizontal component of the grating constant has a finite value equal to the projection of the grating constant $\Lambda$ on the horizontal axis.

Differentiating Eq. 1 yields the following relationship between $\beta$, the change in the optical wavelength, $\Delta\lambda$, and the horizontal component of the grating constant $\Lambda_{//}$.

$$\Delta \beta \cos\beta = \frac{\Delta \lambda}{\Lambda_{//}} \quad \text{(Eq. 2)}$$

Using Eqs. 1 and 2, we get $$\Delta \beta = \frac{\Delta \lambda}{\Lambda_{//}} \frac{1}{\sqrt{1 - \text{Sin}^2\beta}} \quad \text{(Eq. 3)}$$

where $\sin\beta$ is defined by Eq. 1. Eq. 3 thus yields the relationship between changes in the diffraction angle $\beta$ with respect to changes in the optical wavelength $\lambda$ and the grating constant in the horizontal direction, $\Lambda_{//}$. It can be seen from equation 3 that if $\Lambda_{//}$ is reduced. $\Delta\beta$ is increased. For $\Lambda_{//} = \infty$ (which is true for the Lippman case as shown in FIG. 5(a)), then $\Delta\beta = 0$ and dispersion does not exist. These equations show that Lippman holographic mirrors have no chromatic dispersion.

Chromatic dispersion should be avoided in holograms in most applications such as protective visors or window films because any kind of dispersion (a change in $\beta$) causes a rainbow effect. The rainbow effect, although aesthetic, is not satisfactory for most holographic mirror applications. Although the rainbow effect occurs most strongly for the transmission case, even reflection holograms have some minor degree of rainbow effect in transmission due to the presence of some surface relief in the transmission hologram. Referring to FIG. 7, a non-Lippman hologram is shown. It can be seen on the lower edge of the hologram that a certain degree of surface relief corresponding to the Bragg surfaces within the hologram is present. This surface relief can cause unwanted rainbow effects in transmission which obstruct see-through.

Lippman holographic mirrors can be made either narrow or broad band. Lippman holographic mirrors can be made broad band by introducing vertical non-uniformities into the hologram. As shown in FIG. 4, depicting a graph whose vertical access is distance in the Z direction and whose horizontal axis is distance in the X direction, a non-uniform Lippman holographic mirror is shown. The non-uniformity in FIG. 4(a) is the decrease in spacing between the Bragg planes in the Z direction. It can be seen that the Bragg planes become closer together, and thus the grating constant $\Lambda$ becomes smaller, as Z increases. Referring to FIG. 4(b), which is a graph comparing distance in the Z direction to the grating constant $\Lambda$, the non-uniformity of the hologram in FIG. 4(a) is depicted. It can be seen that as Z increases, the grating constant decreases. The general relationship between the grating constant and Z is as follows:

$$\Lambda = \Lambda(Z).$$

The absence of chromatic dispersion from Lippman holographic mirrors makes them highly desirable. Demand for large quantities of these holograms is foreseeable. State of the art production techniques for these holograms is insufficient to meet this demand for a number of reasons. In particular, the current apparatuses and methods for exposing holographic material to form a hologram are not satisfactory. There exists currently no apparatus or method to turn out large volumes of such holograms in a continuous fashion. Recording such holograms by the conventional prism method, where the sidewalls of a prism are exposed to laser light which illuminates the holographic medium at the bottom of the prism, is simply not at this time capable of recording holograms on a mass scale and imposes other important limitations on recording. Thus, it is evident that unless a new mass production method and apparatus is put to use, the increasingly high demand for high performance Lippman holographic mirrors will not be met.

SUMMARY OF THE INVENTION

A method and apparatus for recording Lippman holographic mirrors is presented. Specifically, an apparatus and method for exposing on a mass scale holographic media such as DCG, PVA-based polymers, PMMA-based polymers, and DCG/Polymer grafts are provided. The recording apparatus comprises an exposing cube exposed to light suitable for recording holograms such as laser light. The cube can be either solid or liquid-filled having an index of refraction equal to or nearly equal to the index of refraction of the holographic material to be recorded. The cube is coupled to a meniscus reservoir containing an index-matching fluid. A computer controlled stepper motor drives supply and take up rolls at either side of the exposing cube.

In one embodiment the exposing cube is illuminated on one side with a collimated beam of light. The light propagates through the cube volume and toward the upper surface of the cube. Holographic film stored on the supply roll and held taught at its opposite end by the take-up roll, is transported across the index-matching fluid containing reservoir and the upper surface of the exposing cube under the command of the movements of the computer controlled stepper motor. The index-matching fluid wets the holographic film as it moves across the reservoir and creates the necessary optical contact between the holographic film and the upper surface of the exposing cube to fulfill exposure requirements. The film is exposed as it moves across the upper surface of the cube by a laser beam expanded along one axis to form a plane of light whose projection on the cube is a line. The line of laser light is first reflected off a positionable scanning mirror which scans the line of light projected onto the cube across the side of the cube and consequently across the holographic material located at the upper surface of the cube. The exposed portion of the film is advanced beyond the cube and the index-matching fluid is dried at the trailing edge of the cube. The exposed film may then be rolled up or gathered at the end of the film transport onto the take-up roll, subsequently processed, and encapsulated.

In another embodiment the film moves while it is being exposed. To expose the film, the film is moved past a stationary, nonscanning laser beam, which is in the form of a line, at an appropriate speed to achieve desired exposure. The entire roll can be exposed in this fashion continuously, taken up on the take-up roll, and then subject to subsequent processing operations. In addition to exposing flexible holographic material stored as rolls, recording of coated holographic plates can be accomplished as well. In this way, large amounts of holographic material can be exposed in a relatively short period of time and with relative ease compared to state-of-the-art recording apparatus and methods, thus answering the need for mass production of Lippman holographic mirrors.

DESCRIPTION OF THE PREFERRED EMBODIMENTS

Figure 1:
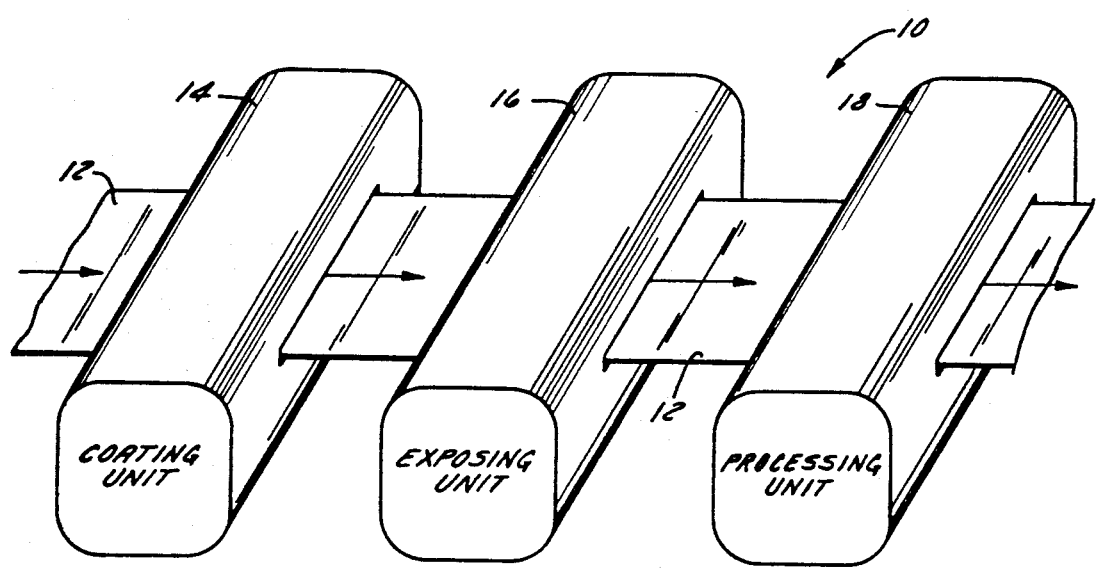
FIG. 1 is a block schematic of a holographic materials recording system.

Referring to FIG. 1, the numeral 10 designates a holographic materials recording system. The system 10 comprises three separate and distinct processes that a holographic material undergoes to create a hologram. A film or web of holographic material 12 is first coated in the coating unit 14. The coating process may be carried out by any number of standard and well known techniques for coating holographic materials. After coating, the holographic film or web 12 is transported to the exposing unit 16. The exposing process involves exposing the holographic material to light suitable for creating the necessary Bragg planes in the volume of the hologram. After exposure, the holographic film or web 12 is transported to the processing unit 18. Processing involves fixing and then dehydration of the holographic material, according to state-of-the-art techniques, in fixers and a series of alcohol water baths. The material is then encapsulated by procedures known in the art. The manufacturing process for holograms generally is described in R. Collier, et al., *Optical Holographic*, Academic Press (1971) and in Chang and Leonard, *Appl. Opt.* 18, 2407 (1979) incorporated by reference herein. After coating, exposing, processing, and encapsulating the holographic film or web 12 is ready to be mechanically fitted in various applications. The present invention is directed to a method and apparatus for carrying out the exposing processes indicated generally by the exposing unit 16 in FIG. 1.

Figure 2:
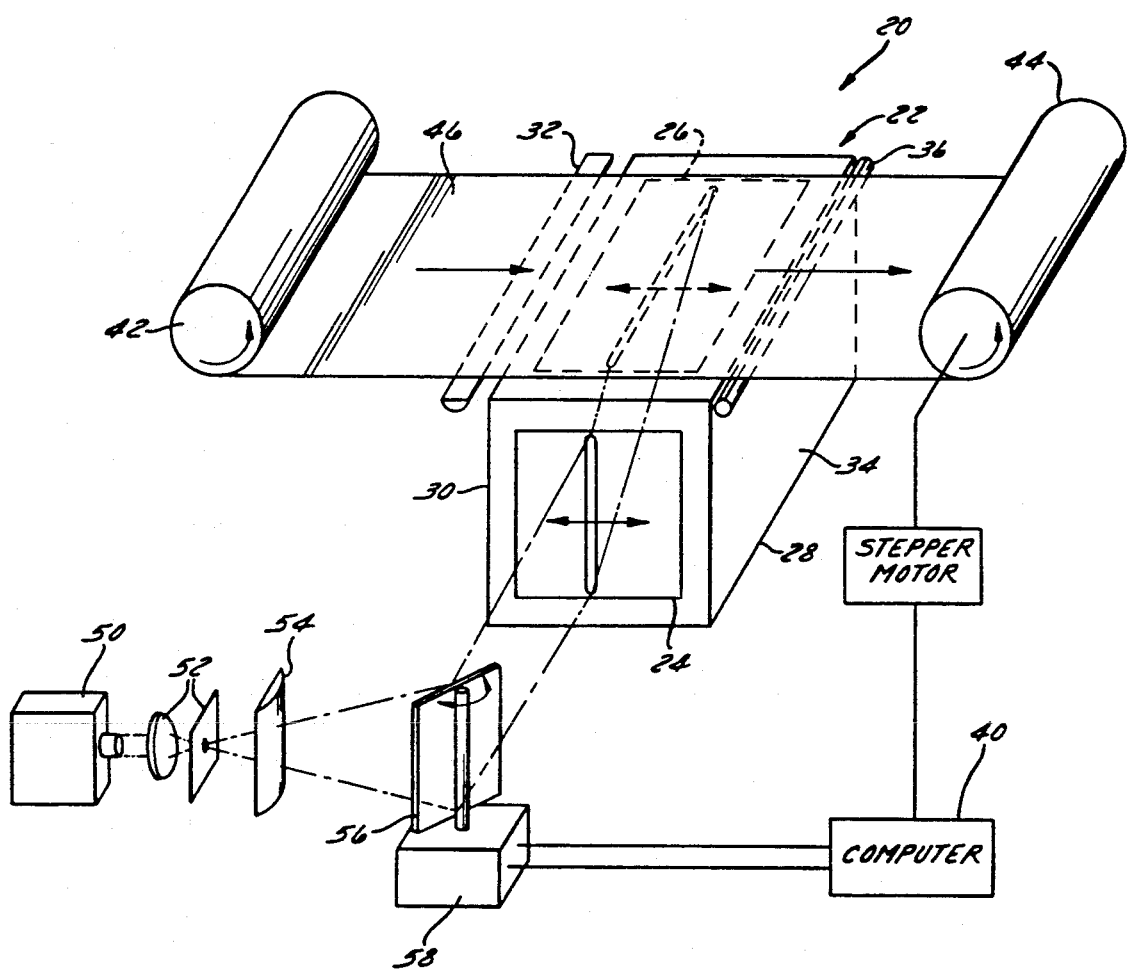
FIG. 2 illustrates an apparatus in accordance with the present invention for exposing holographic materials.
Figure 4A:
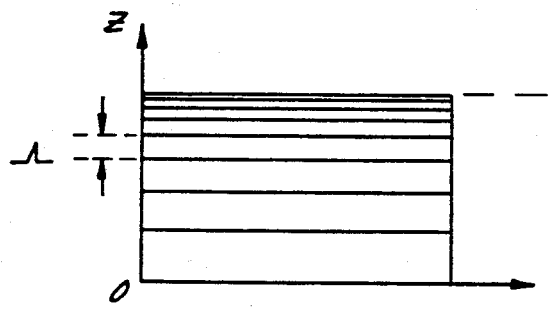
FIGS. 4(a) and 4(b), respectively, provide a schematic of a vertically non-uniform hologram and its vertical non-uniformity.
Figure 4B:
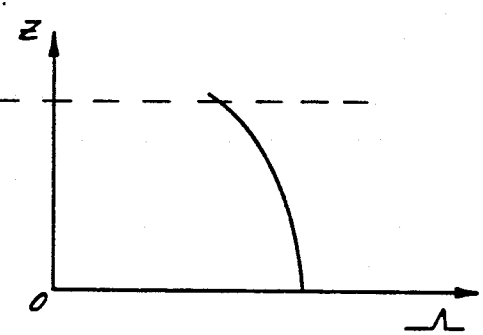
Figure 5A:
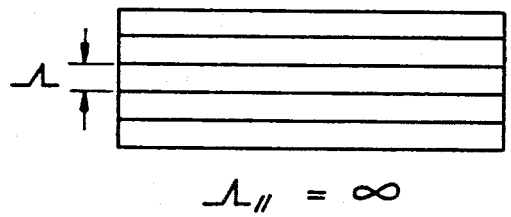
FIGS. 5(a) and 5(b), respectively, provide a schematic of a Lippman hologram and a non-Lippman hologram.
Figure 5B:
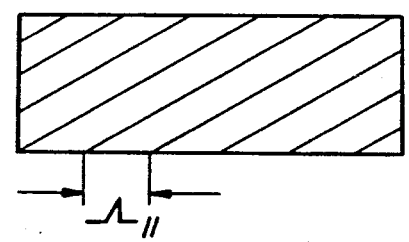
Figure 6:
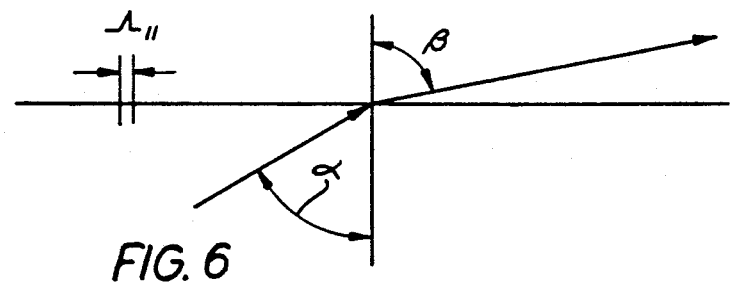
FIG. 6 illustrates the angle of incidence $\alpha$ and the angle of the diffraction $\beta$.
Figure 7:
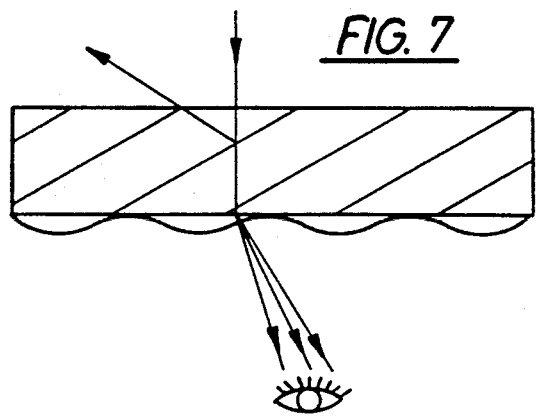
FIG. 7 shows the surface relief of a non-Lippman hologram which contributes to rainbow effect.

Turning now to FIG. 2, a preferred embodiment of the apparatus of the present invention is depicted. The apparatus generally designated 20 comprises an exposing cube 22 having a scanning aperture 24 on one of its sides and an exposure area 26 on its upper surface. The cube 22 rests on its lower surface indicated at 28. The leftmost side 30 of exposing cube 22 holds a meniscus reservoir 32 which contains an optical index-matching liquid. The reservoir may be a trough fed by a quantity of liquid under positive pressure. The rightmost side 34 of exposing cube 22 holds a standard knife-edge dryer 36 used in processing film.

The exposing cube 22 can be made in a number of ways. Exposing cube 22 in a preferred embodiment may be made from a solid cube of glass. In another embodiment, the exposing cube 22 can be a hollow box-like structure made of glass or other suitably transparent material such as acrylic or other plastic containing an index-matching liquid. The liquid and its container should have a refractive index that matches as closely as possible that of the holographic material to be recorded. Likewise, if exposing cube 22 is made from solid glass, its index of refraction should match as closely as possible that of the holographic recording material. If the index of refraction of the exposing cube 22, index-matching fluid in reservoir 32, and the holographic material are different, efficiency of the hologram will suffer.

A preferred embodiment of recording apparatus 20 may also comprise a supply roll 42 and a take-up roll 44. Supply roll 42 holds the supply of holographic film or web which has already been coated. The holographic film 46 is held taught between supply roll 42 and take-up roll 44 and positioned over the meniscus reservoir 32, the exposure area 26, and the knife-edge dryer 34, all of exposing cube 22. The take-up roll may be controlled or indexed by a micro-stepper motor controlled by a suitable controller (not shown) connected to the computer 40. A stepper motor (not shown) having about 1200 micro-steps/revolution and having an all-windings-on or all-windings-off characteristic would be preferred. The computer 40 may be a state-of-the-art personal computer such as an IBM PC programmed and adapted to advance and index the holographic film 46 for proper exposure and take-up.

A light source 50 is positioned to direct light into the scanning aperture 24 of exposing cube 22. Light source 50 in a preferred embodiment may be an Innova 200 model made by Coherent which is a 25-watt multi-line argon laser which puts out five watts of light near a 500 nm wavelength. Any number of light sources, however, may be used given the desired wavelength and characteristics of the holographic material and its ultimate use, such as use in the visible region of the spectrum or infra red use.

A spatial filter 52 may be spaced apart from the light source 50 and in line with the light source 50 and the scanning aperture 24. In a preferred embodiment, the spatial filter may be a model 910 spatial filter from Newport Research Corp. of Fountain Valley, Calif. Spatial filters of this sort have variable objectives, and the objective may be adjusted to achieve the desired beam size for the particular set-up and size of holographic material to be recorded. A cylindrical lens 54 may be spaced apart from the spatial filter 52 by a distance equal to the focal length of the lens and in line with the light source 50 and the scanning aperture 24. The size of the lens and its focal length may be chosen to fit the particular set-up and recording criteria for the particular holographic material and hologram to be produced. A short focal length lens results in a narrow beam exiting from the lens 54.

Spaced apart from the lens 54 and in line with the light source 50 and the scanning aperture 24 may be a one axis scanning mirror 56 fixed to the rotating axis of a galvanometer 58. The reflective surface of the mirror 56 is located at the center of rotation of the galvanometer 58. The precise location of the mirror may be adjusted for any astigmatism or other aberrations in the mirror. The shape of the scanning mirror 56 is elongated and its size may be chosen to correspond to the width and height of the light exiting the lens 54. The galvanometer 58 is connected to the computer 40 which controls its rotation and thus the rotation of the scanning mirror 56 in accordance with the computer's programming and may be synchronized with the supply and take-up rolls 42 and 44. The distance between the cube and the mirror 56 may be determined in accordance with the width of the holographic material to be exposed and the size and positioning of the other elements in the set-up.

The operation of the apparatus depicted in FIG. 2 will now be explained. The programmed computer 40 connected to the micro stepper motor (not shown) through a suitable controller (not shown) first advances the holographic film 46 one frame, which is the length of the exposure area 26 of exposing cube 22. As the film advances, index-matching liquid from the meniscus reservoir 32 wets the film 46 and by capillary action is adhered to the film as it advances across the exposure area 26. The index-matching fluid provides the optical contact between the film and the exposure area 26 necessary to proper transmission of light from the exposing cube 22 to the film 46.

Once the film is advanced to its proper position over the exposure area 26, exposure may begin. The light from light source 50 is incident upon spatial filter 52 which cleans up the light beam. The cleaned-up light beam is then incident upon the cylindrical lens 54 which collimates the beam in the horizontal direction to create a vertical plane of light (the beam's projection is a line). The light from the cylindrical lens 54 is then incident upon the vertically elongated scanning mirror 56 which reflects that light onto one edge of the scanning aperture 24, in this particular embodiment the leftmost edge. Controlled by computer 40 and a suitable controller, the galvanometer 58 causes the scanning mirror to rotate at a rate which passes the projected line of light onto the scanning aperture 24 in a linear fashion across the scanning aperture 24. The rate at which the scanning mirror rotates and thus at which the line of exposure light traverses the scanning aperture 24 may be determined by the computer 40 in accordance with the desired exposure time. The exposure time will, of course, be dependent upon the holographic material to be exposed in accordance with state-of-the-art recording techniques.

The light beam enters the scanning aperture 24 at the angle $\alpha$ and is refracted upward at the diffraction angle $\alpha'$ toward the exposure area 26 in accordance with the refraction index of the exposing cube 22, which in a preferred embodiment may be approximately 1.55 — the index of refraction of DCG —, and is incident upon the exposure area 26 from the inside of exposing cube 22. The refracted line of light thus exposes the full width of the holographic film 46 one exposure light line width at a time from one edge of the exposure area 26 to the other, in a preferred embodiment from left to right. After the scanning mirror 56 has scanned the light line across the exposure area 26, exposure may be stopped and the computer 40 advances the film 46 one frame or the amount desired for the particular hologram to be recorded. As the film 46 is advanced, the knife-edge dryer 36 dries the film 46. As the film is advanced, it is taken up on the take-up roll 44. The computer 40 monitors the speed, tension, and horizontal drift of the film 46.

Figure 3:
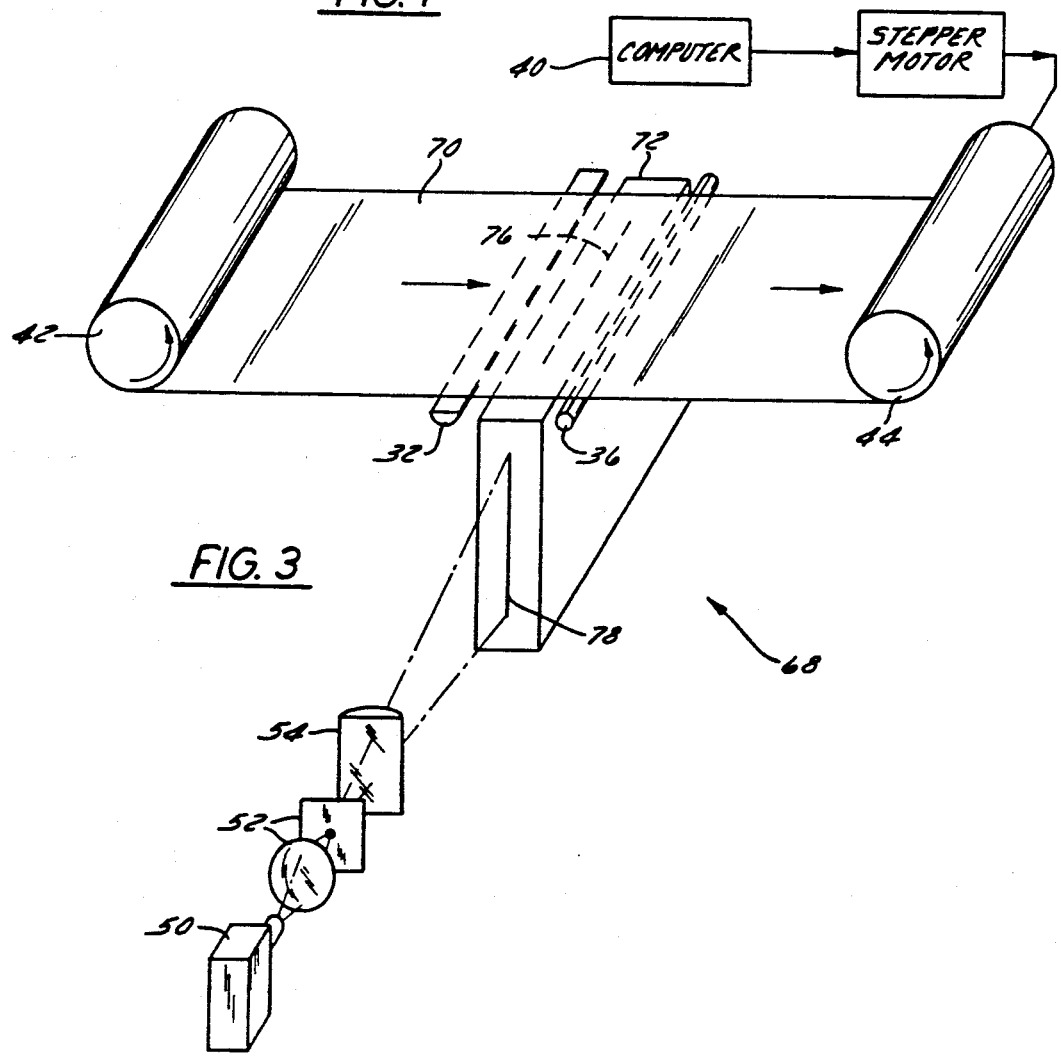
FIG. 3 shows an apparatus also in accordance with the present invention for recording holographic materials.

Referring now to FIG. 3, the embodiment of the present invention shown there will now be explained. The apparatus generally designated 68 in FIG. 3 is the same as the apparatus shown in FIG. 2 but with two differences. First, the exposing cube 72 in FIG. 3 is of a much narrower profile than the exposing cube 22 in FIG. 2 and consequently the exposure area and scanning areas are narrowed proportionately. In fact, the exposure and scanning areas need only be wide enough for the knife-edge light beam to pass through. Second, the apparatus of FIG. 3 does not employ a scanning mirror as in the apparatus in FIG. 2 with its scanning mirror 56 and galvanometer 58. Otherwise, the structure of the two apparatuses in FIG. 2 and FIG. 3 are the same and need not be further stated.

The operation of the apparatus of FIG. 3 having a narrower exposing cube and no scanning mirror will now be explained. The holographic film 70 is taken off the supply roll 42 under the control of computer-controlled stepper motor (not shown). Unlike movement of the film 46 in the prior embodiment, the film 70 is moved across the exposure area 76 (which is narrower than exposure area 26 in FIG. 2) at the upper surface of the exposing cube 72 continuously, and at a rate determined by the computer 40 in accordance with the type and size of the holographic material to be exposed. The light from light source 50 passes through spatial filter 52 and cylindrical lens 54 which expands the laser light in the vertical direction. The vertically expanded plane of light exiting the lens 54 is incident upon the reduced dimension scanning aperture 78, passes through the volume of the exposing cube 72, and into the reduced dimension exposure area 76 of exposing cube 72. If the film 70 were not to advance continuously, then only that area corresponding to the line of light would be exposed because of the absence of the scanning mirror. Thus, in this embodiment, the film 70 may be advanced at a continuous rate and the entire roll can be exposed at one time without interruption. Note that as in the embodiment depicted in FIG. 2, a meniscus reservoir 32 may wet the film before it advances across the exposure area 76 to optically index the film to the exposure area 76 and the knife-edge dryer 36 dries the film before it is wound onto the take-up roll 44. Other suitable drying means may, of course, be used.

The holographic material need not be supplied to the apparatus of the present invention on supply rolls in web form. Rigid plates of coated holographic material likewise can be exposed by the recording apparatuses 20 and 68 via an appropriate manual or computer controlled conveying means.

Furthermore, the exposure area need not be at the upper surface of the exposing cube, but rather could be along one of the sides perpendicular to the scanning aperture or along the bottom of the exposing cube. Capillary action caused by the indexing fluid in contact with the film would cause the film to adhere to a side or bottom surface of the exposing cube while it is advanced.

Some of the advantages of the method and apparatus of the present invention are manifested by a study of the recording of Lippman holographic mirrors. Of the utmost importance in the recording of holograms is stability of the light source and recording structure. Low stability invariably causes poor quality holograms. One good way to maximize stability of the recording system is to decrease the length of exposure time. Another is to employ as simple a system as possible.

With respect to decreasing exposure time in order to increase stability of the system, i.e. decrease its sensitivity to motion or jarring, the following equation is studied:

$$E = I \cdot t,$$

where E defines sensitivity, I defines the intensity of the light used to expose the holographic material, and t defines the time of exposure. Sensitivity E is expressed in units of $J/cm^2$. Power is expressed in units of $W/cm^2$, and time is expressed in units of seconds. The sensitivity, E, for a typical holographic material is between 100–500 $mJ/cm^2$ and is a constant. In order to achieve the highest efficiency holographic mirror from a given material, the holographic material must be exposed with at least this much exposure. Because exposure is dependent on area, it can be seen from the above equation that the amount of exposure time necessary is reduced when the area of exposure is reduced. Relating back to the above equation, given that E is a constant and is determined by the particular holographic material to be recorded, and will not change during the recording process, if the area to be exposed is decreased, then the intensity I increases and t correspondingly decreases in order to keep the product of I times t equal to E. Thus, exposing the holographic material with a narrow line beam enables exposure at maximum efficiency while the holographic material is continuously advancing.

Furthermore, the use of the line light beam avoids the creation of parasitic gratings during recording (i.e., the creation of unwanted transmission gratings) caused by noise from light flare. Light flare is caused by the recording light beam reflecting off of peripheral objects, such as the edge of the exposing cube, and back into the holographic material. It can be seen that the smaller the area of the light beam, the less likely it is that flare will occur.

The simple structure of the recording apparatus of the present invention also makes possible the use of minimal exposure times. The simple lens system, basically the exposing cube and the cylindrical lens, reduces loss of power and straying of the light beam, and insures that the light beam will be as clean as possible. The high continuous power Argon laser also lends to efficiency.

Figure 8:
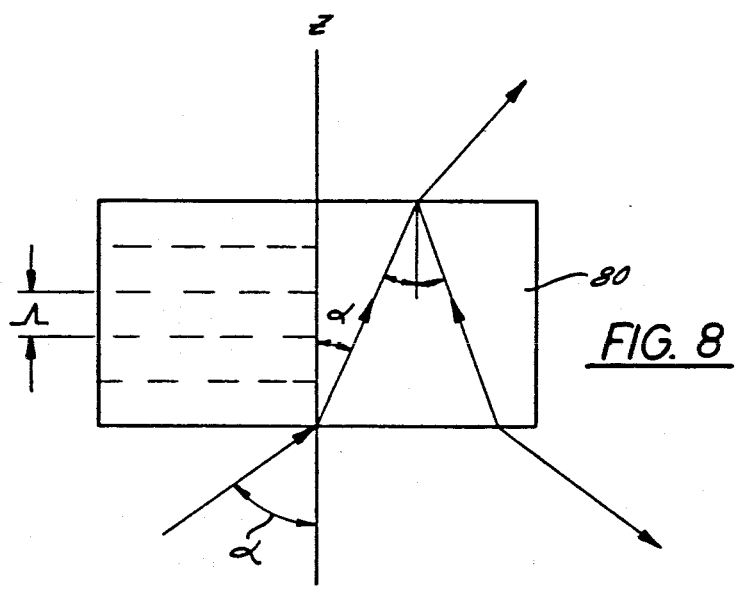
FIG. 8 is a schematic of light waves creating a standing wave pattern in a holographic material during recording of a Lippman holographic mirror.
Figure 9:
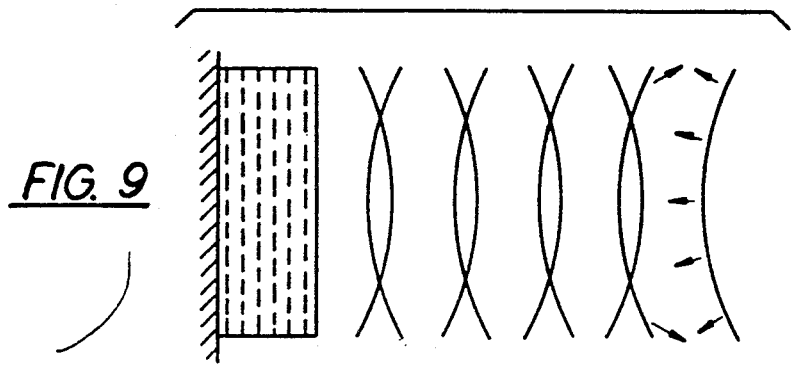
FIG. 9 is a schematic of the cancellation of spherical waves during recording of a standing wave pattern in a holographic medium.

As stated above, stability is critical to efficient hologram recording and can be maximized by the use of only a single recording beam required to record Lippman holograms. Referring now to FIG. 8, the recording of a Lippman holographic mirror, in general terms, will be explained. A volume of holographic material 80 is depicted having a grating constant $\Lambda$ being exposed to a light beam having an incident angle $\alpha$ with respect to the Z axis perpendicular to the Bragg plane to be recorded in the volume and having an angle of diffraction $\alpha'$. The relationship between $\alpha$ and $\alpha'$ is as follows:

$$\sin \alpha = n \cdot \sin \alpha',$$

where n is the refraction index of the holographic medium. For recording, the following equation is applicable:

$$\Lambda = \frac{\lambda_R}{2n\cos \alpha'_R}$$

where $\Lambda$ is the grating constant, $\lambda_R$ is the wavelength of the light used to record the holographic material, and $\alpha'_R$ is the angle of diffraction of the recorded light within the volume during recording. The applicable equation for the playback case is as follows:

$$\Lambda = \frac{\lambda_P}{2n\cos \alpha'_P}$$

where $\Lambda$ is the grating constant, $\lambda_P$ is the wavelength of the light used to play back the hologram, and $\alpha'_P$ is the angle of the light used to play back the hologram with respect to the Bragg lanes in the hologram. It is usual that holograms are played back at normal incidence ($\alpha'_P = 0$) and thus the equation is reduced to $$\Lambda = \frac{\lambda_P}{2n}$$

Comparing the above two equations, the following is derived:

$$\lambda_P = \frac{\lambda_R}{\cos \alpha'_R}.$$

It can be seen that if the angle of light used to record the hologram, $\alpha'_R$, is 60°, then because the cosine of 60° equals 0.5, the equation is reduced to the following: $\lambda_P = 2\lambda_R$. Thus, it can be seen that the hologram can be recorded at one wavelength and played back at a wavelength twice as large as the recording wavelength. For example, if the recording wavelength is 488 nm., which is about the wavelength produced by a typical argon laser, and the recording angle, $\alpha'_R$ equals 60°, the play back wavelength can equal 974 nm which is in the near infra red region. This allows the very convenient use of visible light such as an argon laser to record a hologram that will ultimately be used for infra red applications. The structure of the apparatus of the present invention capitalizes on this phenomenon because it allows heretofore unobtainable large incident recording angles.

By exposing the exposing cube to light at one of its sides and placing the holographic material to be recorded at another of the cube's sides perpendicular to the side on which the light beam is first incident, extremely large recording angles, up to 44° for $\alpha_R$, can be achieved. As shown by the above equation, the larger the recording angle, $\alpha'_R$, the greater the wavelength of light that can be used to play back the hologram, thus enabling the creation of holograms for use in the near IR region using visible recording light.

Another advantage of the use of the present invention for recording Lippman holographic mirrors is that an appropriate standing wave pattern which will produce Bragg planes parallel to the surface of the holographic volume occurs even if the incident light beam itself is somewhat non-uniform, such as in the case of a horizontally non-uniform beam, (e.g., spherical). This is due to cancellation of the incident curved light waves with the reflected curved light waves and is made possible by the fact that the holographic material to be recorded is located very close to the plane of symmetry (i.e., the mirror of the holographic volume). The benefits of this construction come into play to cause the creation of an efficient Lippman holographic mirror, even in the case where the recording structure is somewhat unstable causing small movement. The wave patterns recorded in the holographic volume will remain unchanged because the non-uniform incident light caused by the movement will be cancelled by the non-uniform light reflected from the plane of symmetry.

It is to be emphasized that embodiments of the present invention not disclosed herein are fully intended to be within the scope of the appended claims.

What is claimed is:

1. An apparatus for exposing coated holographic material to form a Lippman holographic mirror:
   a source for a beam of laser light;
   a lens upon which the beam of laser light is incident which expands the light beam in one direction to form a plane of light whose projection is a line;
   a volume of an optically transparent medium upon which the expanded light beam is projected and through which the light propagates to an adjacent side of the volume, the holographic material being in contact with the adjacent side; and
   index-matching fluid dispensing means for optically coupling the holographic material and the adjacent side so that the light which propagates through the volume exposes the holographic material.

2. An apparatus for exposing coated holographic material to form a Lippman holographic mirror comprising:
   a source for a beam of laser light;
   a lens upon which the beam of laser light is incident which expands the light beam in one direction to form a plane of light whose projection is a line;
   a volume of an optically transparent medium upon which the expanded light beam is projected and through which the light propagates to an adjacent side of the volume;
   means for transporting the holographic material across and in contact with the adjacent side; and
   index-matching fluid dispensing means for optically coupling the holographic material and the adjacent side so that the light which propagates through the volume exposes the holographic material.

3. The invention as defined in claim 2 further comprising means for supplying the holographic film to the means for transporting, and take-up means for collecting the holographic material after exposure.

4. An apparatus for exposing coated holographic material to form a Lippman holographic mirror comprising:
   a source for a beam of laser light;
   a lens upon which the beam of laser light is incident which expands the light beam in one direction to form a plane of light whose projection is a line;
   scanning reflector means upon which the plane of light is incident;

a volume of an optically transparent medium upon which the light reflected from the scanning reflector means is scanned and through which the light propagates to an adjacent side of the volume; and index-matching fluid dispensing means for optically coupling the holographic material and the adjacent side so that the light which propagates through the volume scans and exposes the holographic material.

5. The invention as defined in claim 4, the volume comprising a cube of glass filled with an index matching fluid having an index of refraction which matches that of the holographic material.

6. The invention as defined in claim 4, the index-matching fluid dispensing means comprising an elongated trough of index-matching fluid attached to the volume.

7. The invention as defined in claim 4 further comprising means for filtering the beam of laser light disposed between the source and the lens.

8. The invention as defined in claims 1, 2, or 4, the volume having an index of refraction which matches that of the holographic material.

9. The invention as defined in claims 1, 2, or 4, the index-matching fluid having an index of refraction which matches that of the holographic material.

10. The invention as defined in claims 1, 2, or 4, the source of light comprising an argon laser.

11. The invention as defined in claims 1, 2, or 4, the lens comprising a cylindrical lens.

12. The invention as defined in claims 1, 2, or 4, the volume comprising a solid cube of glass.

13. The invention as defined in claims 1, 2 or 4 further comprising means for drying the holographic material after exposure.

14. An apparatus for exposing coated holographic material to form a Lippman holographic mirror comprising:
a cube having an index of refraction which matches that of the holographic material, illuminated on one side by a beam of light which propagates through the cube to an adjacent side of the cube with which the holographic material is optically coupled by index matching fluid so that the holographic material is exposed; and dispensing means for dispensing said fluid, disposed on the cube.

15. The invention as defined in claim 14, the volume comprising a cube of glass, or acrylic or other plastic.

16. An apparatus for exposing coated holographic material to form a Lippman holographic mirror comprising:
a volume of material which has incident thereon light used to expose holographic material, one surface of which is adapted to be in contact with the holographic material; and
a meniscus reservoir containing index-matching fluid for wetting the surface of the holographic material in contact with the one surface to optically couple the holographic material and the one surface.

17. A method for exposing a coated holographic material to form a Lippman holographic mirror comprising:
wetting one surface of the holographic material with an index-matching fluid contained in means for dispensing said fluid;
placing the wetted surface in con&:act with one side of a volume of transparent medium having an adjacent side; and scanning the adjacent side with a light beam expanded in one direction to form a plane of light whose projection on the adjacent side is a line.

18. A method for exposing a coated holographic material to form a Lippman holographic mirror comprising the steps of:
wetting one surface of the holographic material with an index-matching fluid contained in a meniscus reservoir;
placing the wetted surface in contact with one side of a volume of transparent medium having an adjacent side;
conveying the holographic material across the one side; and
exposing the adjacent side with a light beam expanded in one direction to form a plane of light whose projection is a line.

19. A method for exposing a coated holographic material to form a Lippman holographic mirror comprising the steps of:
optically coupling, using index matching fluid, the holographic material to one side of a cube having an index of refraction which matches that of the holographic material, said cube having disposed thereon means for dispensing said fluid;
conveying the holographic material across the one side; and
exposing an adjacent side of the cube to light suitable for exposing the holographic material.

20. A method for exposing a coated holographic material to form a Lippman holographic mirror comprising the steps of:
optically coupling, using index matching fluid, the holographic material to one side of a cube having an index of refraction which matches that of the holographic material, said cube having disposed thereon means for dispensing said fluid;
scanning an adjacent side of the cube with light suitable for exposing the holographic material.

21. A method for exposing a coated holographic material to form a Lippman holographic mirror comprising the steps of:
optically coupling, using index matching fluid, the holographic material to one side of a volume of transparent material, said volume having disposed thereon means for dispensing said fluid; and
exposing an adjacent side of the volume to a light beam expanded in one direction to form a plane of light whose projection on the adjacent side is a line.

22. An apparatus for exposing coated holographic material to form a Lippman holographic mirror comprising:
a source for a beam of laser light;
a lens upon which the beam of laser light is incident which expands the light beam in one direction to form a plane of light whose projection is a line;
a volume of an optically transparent medium upon which the expanded light beam is projected and through which the light propagates to an adjacent side of the volume, the holographic material being in contact with the adjacent side; and
index-matching fluid dispensing means for optically coupling the holographic material and the adjacent side so that the light which propagates through the volume exposes the holographic material, the volume comprising a cube of glass filled with an index-matching fluid having an index of refraction which matches that of the holographic material.

23. An apparatus for exposing coated holographic material to form a Lippman holographic mirror comprising:
- a source for a beam of laser light;
- a lens upon which the beam of laser light is incident which expands the light beam in one direction to form a plane of light whose projection is a line;
- a volume of an optically transparent medium upon which the expanded light beam is projected and through which the light propagates to an adjacent side of the volume;
- means for transporting the holographic material across and in contact with the adjacent side; and
- index-matching fluid dispensing means for optically coupling the holographic material and the adjacent side so that the light which propagates through the volume exposes the holographic material, the volume comprising a cube of glass filled with an index-matching fluid having an index of refraction which matches that of the holographic material.

24. An apparatus for exposing coated holographic material to form a Lippman holographic mirror comprising:
- a source for a beam of laser light;
- a lens upon which the beam of laser light is incident which expands the light beam in one direction to form a plane of light whose projection is a line;
- a volume of an optically transparent medium upon which the expanded light beam is projected and through which the light propagates to an adjacent side of the volume, the holographic material being in contact with the adjacent side; and
- index-matching fluid dispensing means for optically coupling the holographic material and the adjacent side so that the light which propagates through the volume exposes the holographic material, the index-matching fluid dispensing means comprising an elongated trough of index-matching fluid attached to the volume.

25. An apparatus for exposing coated holographic material to form a Lippman holographic mirror comprising:
- a source for a beam of laser light;
- a lens upon which the beam of laser light is incident which expands the light beam in one direction to form a plane of light whose projection is a line;
- a volume of an optically transparent medium upon which the expanded light beam is projected and through which the light propagates to an adjacent side of the volume;
- means for transporting the holographic material across and in contact with the adjacent side; and
- index-matching fluid dispensing means for optically coupling the holographic material and the adjacent side so that the light which propagates through the volume exposes the holographic material, the index-matching fluid dispensing means comprising an elongated trough of index-matching fluid attached to the volume.

* * * * *

UNITED STATES PATENT AND TRADEMARK OFFICE
CERTIFICATE OF CORRECTION

PATENT NO. : 5,083,219

DATED : January 21, 1992

INVENTOR(S) : Tomasz P. Jannson, et al.

It is certified that error appears in the above-identified patent and that said Letters Patent is hereby corrected as shown below:

Column 1, Line 21, cancel "gradings" and insert -- gratings --;

Column 1, Line 45, after "depicted" insert a period (.);

Column 1, Line 61, after "constant" isnert a period (.);

Column 2, Line 59, cancel "access" and insert -- axis --;

Column 8, Line 53, after "holographic" cancel the colon (:);

Column 9, Line 28, cancel "lanes" and insert -- planes --;

Column 11, Line 66, cancel "con&:act" and insert -- contact --.

Signed and Sealed this

Fourth Day of May, 1993

Attest:

MICHAEL K. KIRK

*Attesting Officer*    *Acting Commissioner of Patents and Trademarks*